(12) United States Patent
Guering

(10) Patent No.: US 11,352,119 B2
(45) Date of Patent: Jun. 7, 2022

(54) LINKING PART DESIGNED TO BE LINKED TO A SUPPORT ELEMENT OF AN AIRCRAFT

(71) Applicant: AIRBUS OPERATIONS (S.A.S.), Toulouse (FR)

(72) Inventor: Bernard Guering, Montrabe (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 252 days.

(21) Appl. No.: 16/698,053

(22) Filed: Nov. 27, 2019

(65) Prior Publication Data
US 2020/0172221 A1   Jun. 4, 2020

(30) Foreign Application Priority Data

Nov. 30, 2018   (FR) ...................................... 1872109

(51) Int. Cl.
*B64C 1/06* (2006.01)
*B64F 5/10* (2017.01)

(52) U.S. Cl.
CPC ............ *B64C 1/069* (2013.01); *B64C 1/0683* (2020.01); *B64F 5/10* (2017.01)

(58) Field of Classification Search
CPC ......... B64C 1/069; B64C 1/0683; B64C 1/06; E04B 2001/2415; E04B 1/24; E04B 1/2403; E04B 2001/2448
See application file for complete search history.

(56) References Cited

U.S. PATENT DOCUMENTS

| | | | |
|---|---|---|---|
| 2,584,015 A * | 1/1952 | Hawes | E04G 13/00 248/354.4 |
| 5,927,650 A | 7/1999 | Huber | |
| 2004/0050498 A1 | 3/2004 | Herrmann et al. | |
| 2013/0221156 A1* | 8/2013 | Guering | B64C 1/061 244/119 |

FOREIGN PATENT DOCUMENTS

| | | |
|---|---|---|
| DE | 31 27 736 | 2/1983 |
| EP | 0 547 823 | 6/1993 |

OTHER PUBLICATIONS

French Search Report and Written Opinion for FR1872109, dated Jul. 31, 2019, 7 pages.

* cited by examiner

*Primary Examiner* — Timothy D Collins
*Assistant Examiner* — Eric Acosta
(74) *Attorney, Agent, or Firm* — Nixon & Vanderhye P.C.

(57) ABSTRACT

A linking part for an aircraft is disclosed having an elongated section including an internal longitudinal seat and a tenon mounted in the seat. The tenon includes a linking element at a free longitudinal end thereof and configured in a retracted position in which the tenon is fully inserted in the seat and does not create an obstruction, enabling the linking part to be easily moved towards the support element, or a deployed position (P2) in which the free longitudinal end of the tenon is outside the seat and is able to be linked using the linking element to the support element, thereby enabling a link to be made simply and quickly.

19 Claims, 5 Drawing Sheets

LINKING PART DESIGNED TO BE LINKED TO A SUPPORT ELEMENT OF AN AIRCRAFT

CROSS REFERENCE TO RELATED APPLICATION

This application claims priority to and incorporates by reference French Patent Application Number 1872109, filed on Nov. 30, 2018.

BACKGROUND

1. Field of the Invention

The disclosure generally relates to a fastening mechanism and, more specifically, to a linking part configured to be linked to a support element of an aircraft.

2. Description of the Related Art

Such a linking part is used in the aeronautics and aerospace industries to carry out a structural assembly operation of linking a part to another mechanical part, component, or structure.

The present invention can be applied more specifically to the fastening of mechanical parts to an aircraft, for example, a commercial or transport airplane, and in particular to the fastening of a nose cone module to the fuselage of the aircraft.

In order to reduce the manufacturing time of an aircraft, it is envisaged for operations to be carried out in parallel, notably by developing modularity. To do so, modules are prefabricated and preassembled, before being integrated into the structure of the fuselage of the aircraft at a later stage in the manufacturing process. This assembly mode can in particular relate to a nose cone module. For this purpose, the nose cone module can be fitted with a floor, systems (routes, equipment), a cockpit and commercial elements (galley, toilets, and bulkhead).

To efficiently integrate such a fully equipped nose cone module into an empty structural envelope of the fuselage, it must be possible to connect the interfaces (or linking or fastening points) between the nose cone module and the fuselage as simply as possible, with a minimum of additional work to be carried out subsequently.

The extreme proximity of certain elements to the structure (toilets, galley, bulkheads, and components of the cockpit) requires an integration path of the module that is both horizontal and rectilinear, from the beginning to the end of the movement of the module.

Such a horizontal rectilinear path generates difficulties for certain structural links that have raised elements projecting from the module and that have to be made, between the module and the structure of the fuselage, in order to structurally dock the module in the fuselage.

This specific integration requires the ability to move the module forward without difficulty, then to perform the linking operation or operations simply and quickly with a minimum of tooling and without any risk of damaging the environment (pre-fitted with systems).

SUMMARY

A linking part is disclosed to be linked to a support element of an aircraft, and that the linking part does not constitute an obstruction during installation thereof, while enabling a link to be made simply and quickly.

According to an exemplary embodiment, the linking part has at least one hollow elongated section, the elongated section having an internal longitudinal seat, and the linking part also having a tenon, the tenon having a linking element at a free longitudinal end, the tenon being mounted in the seat and being able to adopt one or other of the following two longitudinal positions:

a retracted position in which the tenon is fully inserted in the seat, and a deployed position in which the tenon is partially withdrawn from the seat, the free longitudinal end including the linking element being outside the seat and being able to be linked by means of the linking element to the support element.

Thus, the present invention allows, by holding the tenon used to make the link in the retracted position, to prevent the tenon from constituting an obstacle, and enables the linking part to be moved more easily towards the support element, notably in a direction orthogonal to the longitudinal direction of the elongate section.

Furthermore, once the desired position in the plane orthogonal to the longitudinal direction has been reached, the desired longitudinal position can be reached by moving the tenon from the retracted position to the deployed position in the longitudinal direction, which enables the tenon to be moved to a position where the tenon can be directly linked to the support element.

The linking part therefore enables a link (or assembly) to be made simply and quickly, without constituting an obstacle during the positioning thereof.

Advantageously, the tenon has a longitudinal oblong hole that is designed to be traversed by at least one fastening screw.

Furthermore, in a first embodiment, the tenon may be configured to be held in the retracted position by friction and, and in a second embodiment, the linking part may have at least one screw configured to hold the tenon in the retracted position.

Furthermore and advantageously, the tenon is provided with a notched face, the linking part also has a wedge that is also provided with a notched face, the wedge being rigidly connected to the elongate section of the linking part inside the seat, and the notched faces of the tenon and of the wedge are designed to be complementary so as to be able to hold the notched faces together once brought into (and held in) contact with one another. The linking part may include at least one screw that is able to hold the notched faces in contact with one another in a clamped position.

Furthermore and advantageously, the linking part also includes a pressure distribution wedge that is designed to be fastened to the tenon by means of a plurality of screws.

Furthermore and advantageously, the linking element has a ball joint mounted in an opening formed in the free longitudinal end of the tenon.

The present invention also relates to a mechanical assembly of an aircraft that includes a linking part, such as the one described above, and a support element to which the linking part is linked.

Advantageously, the support element is provided with a clevis to which the ball joint of the tenon of the linking part is linked.

The present invention also relates to an aircraft module, and more specifically to a nose cone module, that includes a linking part such as the one described above.

The present invention also relates to an aircraft that includes at least one such mechanical assembly and/or at least one such module.

In an exemplary embodiment, the aircraft includes a fuselage with at least one structural envelope into which is fastened at least one module, the module being fastened in the structural envelope by at least a plurality of mechanical assemblies.

The present invention also relates to a method for linking (or assembling) a linking part, such as the one specified above, to a support element.

According to the invention, the linking method includes successive steps involving at least:
- effecting a relative movement between, on one hand, the linking part in which the tenon is in the retracted position and, on the other hand, the support element in order to bring the linking part, within a plane orthogonal to the longitudinal direction defined by the tenon of the linking part, into a position in which a link can be made in this orthogonal plane,
- bringing the tenon into the deployed position such that the linking element of the tenon is in an end position (in space) where it can be linked to a complementary linking element of the support element, and
- linking the linking element to the complementary linking element such as to link the linking part to the support element.

BRIEF DESCRIPTION OF THE DRAWINGS

For an understanding of embodiments of the disclosure, reference is now made to the following description taken in conjunction with the accompanying drawings, in which.

In the accompanying drawings, like reference characters refer to the same or similar parts throughout the different views. The drawings are not necessarily to scale, emphasis instead being placed upon illustrating particular principles, discussed below.

DETAILED DESCRIPTION OF EMBODIMENTS

Some embodiments will now be described with reference to the Figures.

Figure 1:
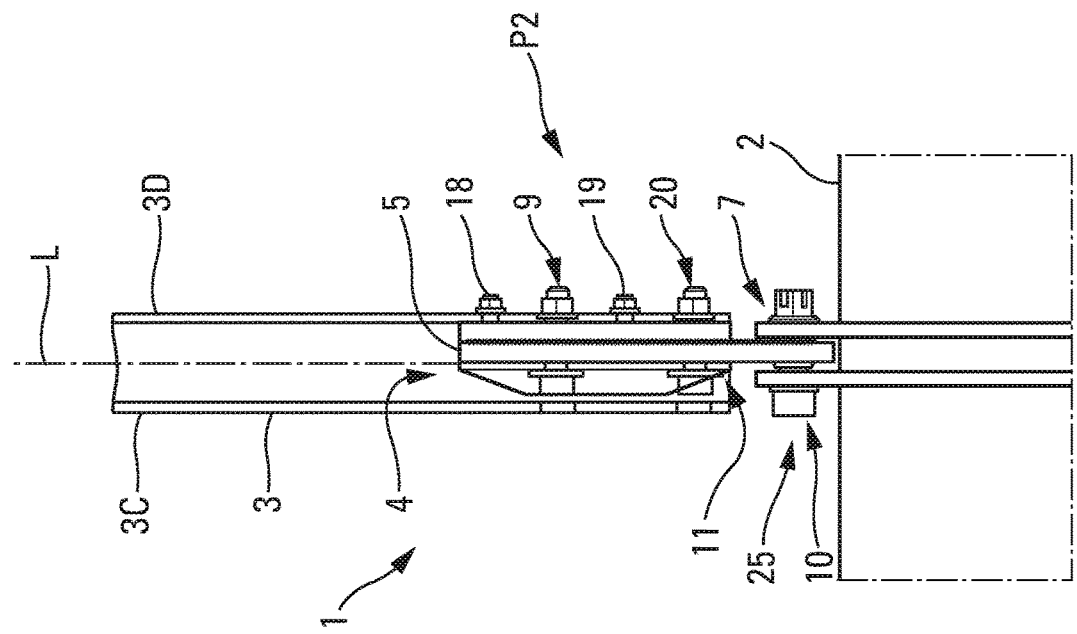
FIG. 1 is a cross-sectional view of an exemplary embodiment of a linking part prior to being linked to a support element.
Figure 2:
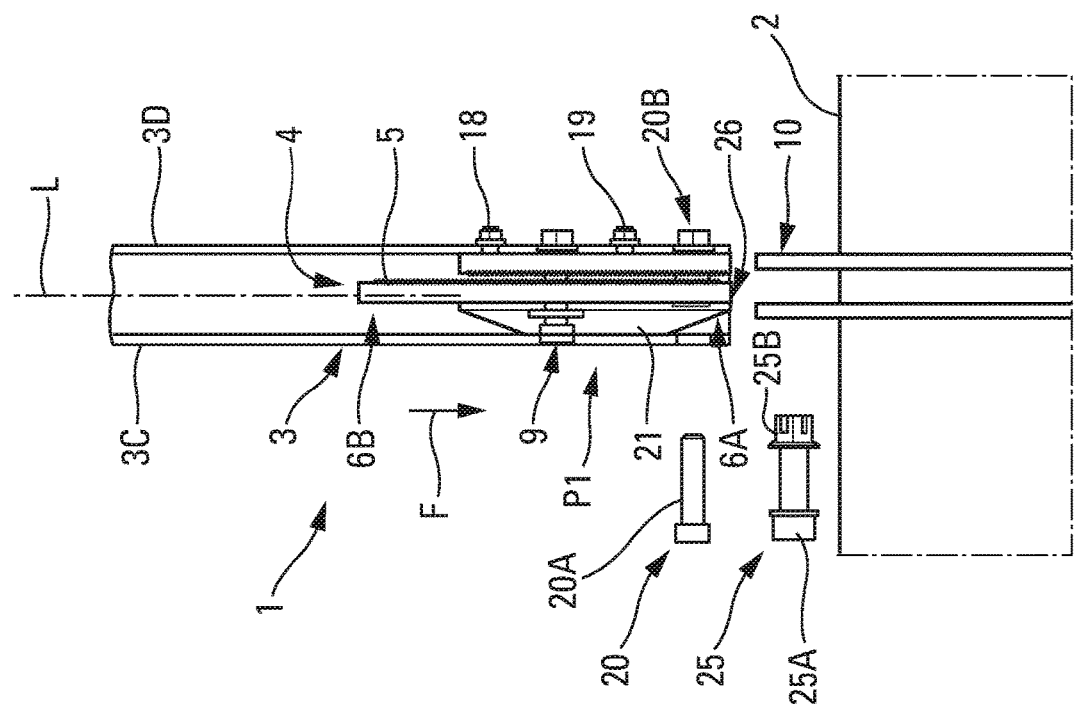
FIG. 2 is a cross-sectional view similar to the view in FIG. 1 after being linked to a support element and in a deployed position.

Referring to FIGS. 1 and 2, a linking part 1 is illustrated and configured to be linked to a support element 2 of an aircraft, such as, but not limited to, a frame or a cross member. The linking part 1 has at least one elongated section 3, as shown in FIGS. 1 and 2. The linking part 1 can correspond to any mechanical part of any shape that is configured to be linked and that has at least one such elongated section 3 (or portion).

The elongated section 3 is elongated in a longitudinal direction along a longitudinal axis L. Furthermore, the elongated section 3 may be at least partially hollow, such as to have an internal longitudinal seat 4.

The linking part 1 also has a tenon 5. The tenon 5 corresponds to an elongated rod, for example, in the form of a plate with a rectangular cross section. The tenon 5 is mounted in the internal longitudinal seat 4, as will be explained in greater detail below.

The elongated section 3, which may be, for example, a peg, can have a cross section of any shape (square, rectangular, round, oval, etc.), notably as a function of its anticipated use. This cross section usually defines the cross section of the seat 4. Likewise, the tenon 5 can also have a cross section of any shape (square, rectangular, round, oval, etc.), notably as a function of its anticipated use, with a cross-section size, shape, and configuration that enables it to be received within the seat 4.

Figure 4:
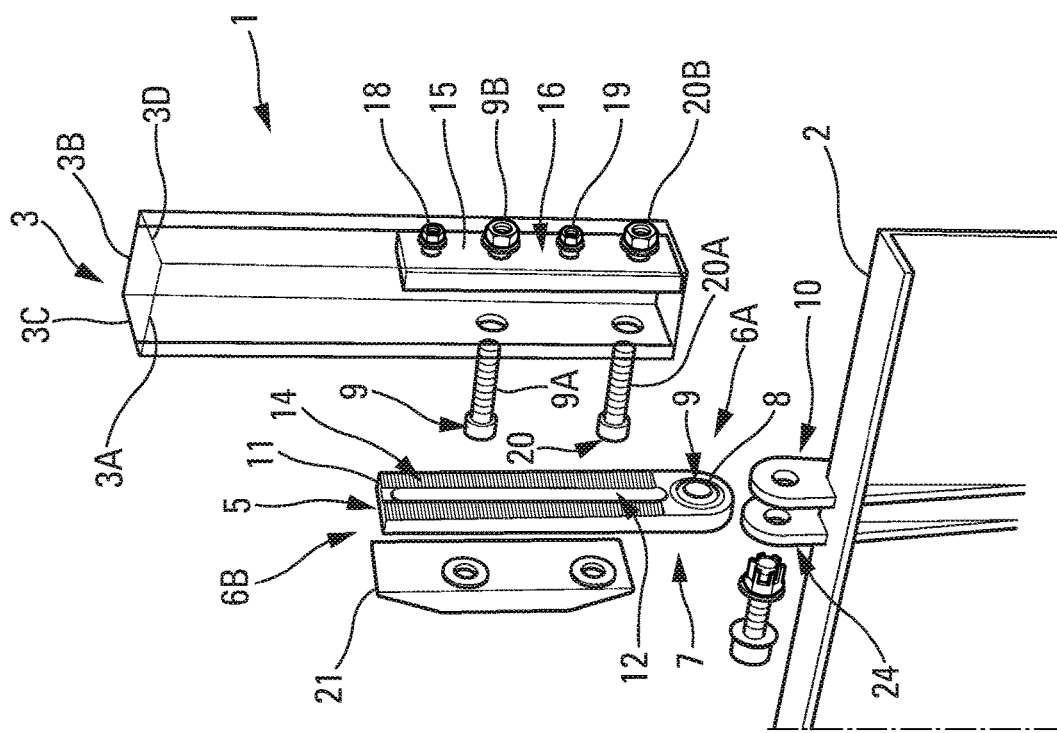
FIG. 4 is a view similar to the view in FIG. 3 but taken from a second side.

Referring to FIGS. 1 to 7, it can be seen that the elongated section 3 has a rectangular cross section having four longitudinal walls 3A, 3B, 3C and 3D (arranged parallel to the longitudinal axis L). The walls 3A and 3B are defined along the length of the rectangular cross section and the walls 3C and 3D are defined across the width of the rectangular cross section, as shown in FIG. 4.

It is noted that the adjectives "top" and "bottom" are defined with respect to the longitudinal direction along the longitudinal axis L, specifically "bottom" refers to the direction from the linking part 1 to the support element 2, as shown by the arrow F in FIG. 1, and "top" refers to the opposite direction to the direction shown by the arrow F.

Figure 3:
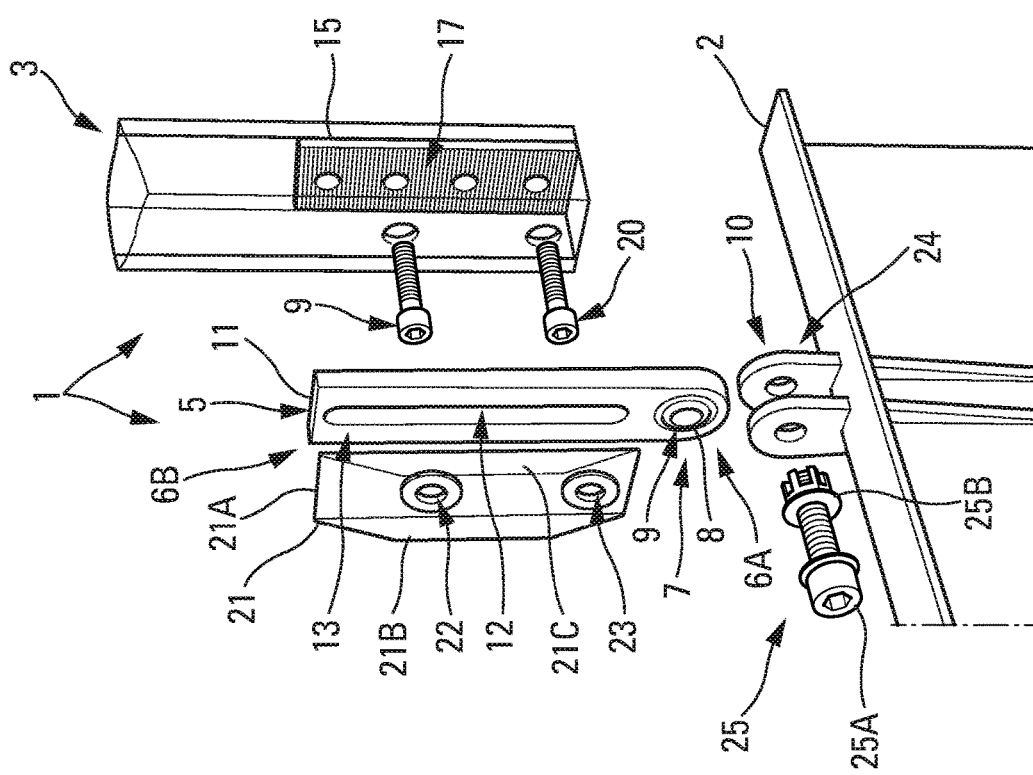
FIG. 3 is a partially exploded perspective view of an exemplary embodiment of elements of a linking part before linking and taken from one side.

The tenon 5 has two opposing longitudinal ends 6A and 6B, specifically a bottom longitudinal end 6A and a top longitudinal end 6B, as best seen in FIG. 1. The tenon 5 has a linking element 7 at the so-called free longitudinal end 6A, as also shown in FIGS. 3 and 4. This linking element 7 can correspond to any type of element enabling a link to be made with a complementary linking element 10 (as specified below) that is part of the support element 2.

In an exemplary embodiment, the linking element 7 has a ball joint 8 mounted in an opening 9 formed in the free longitudinal end 6A of the tenon 5, as shown in FIGS. 3 and 4. The movability of the ball joint 8 allows the movement between the linking element 7 and the linking part 1 about the complementary linking element 10. The tenon 5 as described above is therefore mounted in the internal longitudinal seat 4, as shown in FIGS. 1 and 2.

Furthermore, the tenon 5 is able to adopt one or other of the following two longitudinal positions (along the longitudinal axis L):
- a retracted position P1 in which the tenon is fully inserted (or retracted) into the seat 4, as shown in FIG. 1, and
- a deployed position P2, in which the tenon is partially removed (or withdrawn) from the seat 4 through an opening 26 (provided at the bottom end of the elongated section 3).

In this deployed position P2, at least the free longitudinal end 6A of the tenon 5, which is provided with the linking element 7, is outside the seat 4 and can be linked by means of the linking element 7 to the complementary linking element 10 of the support element 2, as shown in FIG. 2.

To switch from the retracted position P1 to the deployed position P2, the tenon 5 can be moved longitudinally downwards along the longitudinal axis L in the direction shown by the arrow F in FIG. 1. The length of the movement is such as to be adjusted to the space between the bottom of the elongate section 3 and the support part 2 such as to enable the linking element 7 to be moved to a position in which the element can be linked to the complementary linking element 10.

The tenon 5 is held inside the seat 4 in the retracted position P1, notably during movement of the linking part 1, for example to move the part close to the support element 2. Various different solutions can be envisaged to hold the tenon.

In an exemplary embodiment, the linking part 1 has at least one bolt 9 with a screw 9A and a nut 9B, which is designed to hold the tenon 5 in the retracted position P1, as shown in FIG. 1, by fastening the tenon to the wall 3D of the elongate section 3. The bolt 9 should therefore be loosened to enable the tenon 5 to be moved to the deployed position P2.

Furthermore, in another exemplary embodiment, the tenon may be configured to be held in the retracted position P1 by friction. To do so, an additional holding part may be configured to hold the tenon 5 in the seat 4 or simply a slightly widened portion of the tenon 5 to hold same by contact may be provided. Such holding must enable the tenon 5 to be moved into the deployed position P2 (by acting on the tenon).

Referring to FIGS. 3 and 4, the tenon 5 is provided in the form of a plate 11 that is substantially rectangular in a plan view, the length of the plate being parallel to the longitudinal axis L. The plate 11 has an oblong hole 12 formed along the longitudinal axis L. This oblong hole 12 is designed to be traversed by at least one fastening screw, such as the screw 9A, as specified below.

The tenon 5 has a straight edge at the top longitudinal end 6B and a rounded edge at the bottom longitudinal end 6A. Furthermore, the plate 11 forming the tenon 5 has two opposing faces, specifically a smooth face 13, as seen in FIG. 3, and a notched or serrated face 14, as seen in FIG. 4. The notched face 14 has a plurality of projecting notches, as explained hereinbelow.

Figure 5:
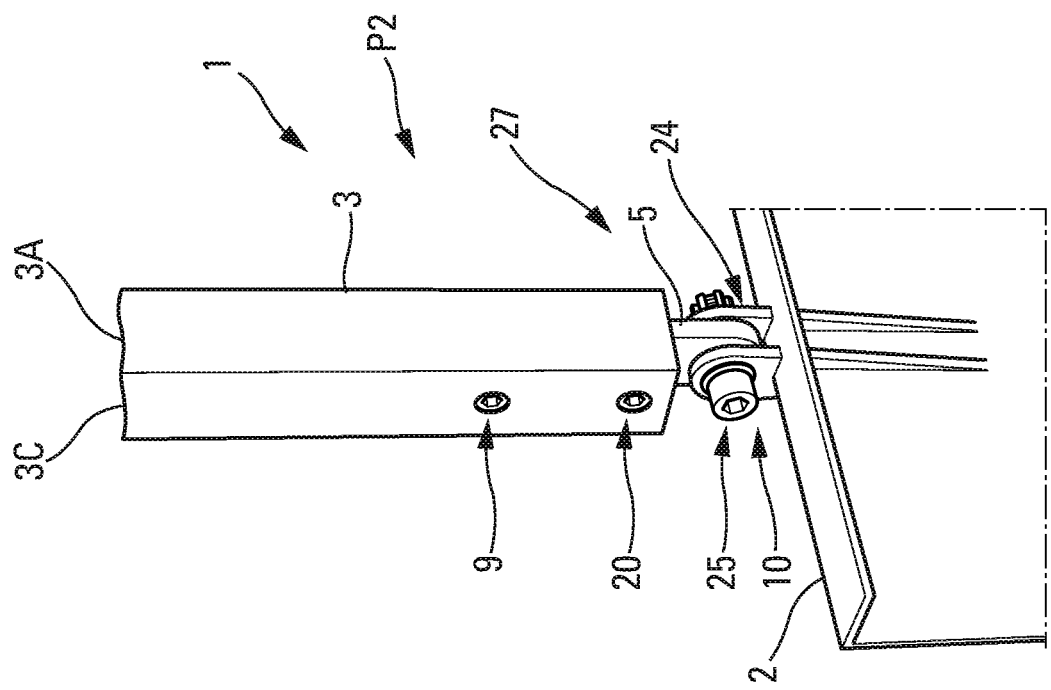
FIG. 5 is a perspective view similar to the view in FIG. 2 after linking and taken from a first side.
Figure 7:
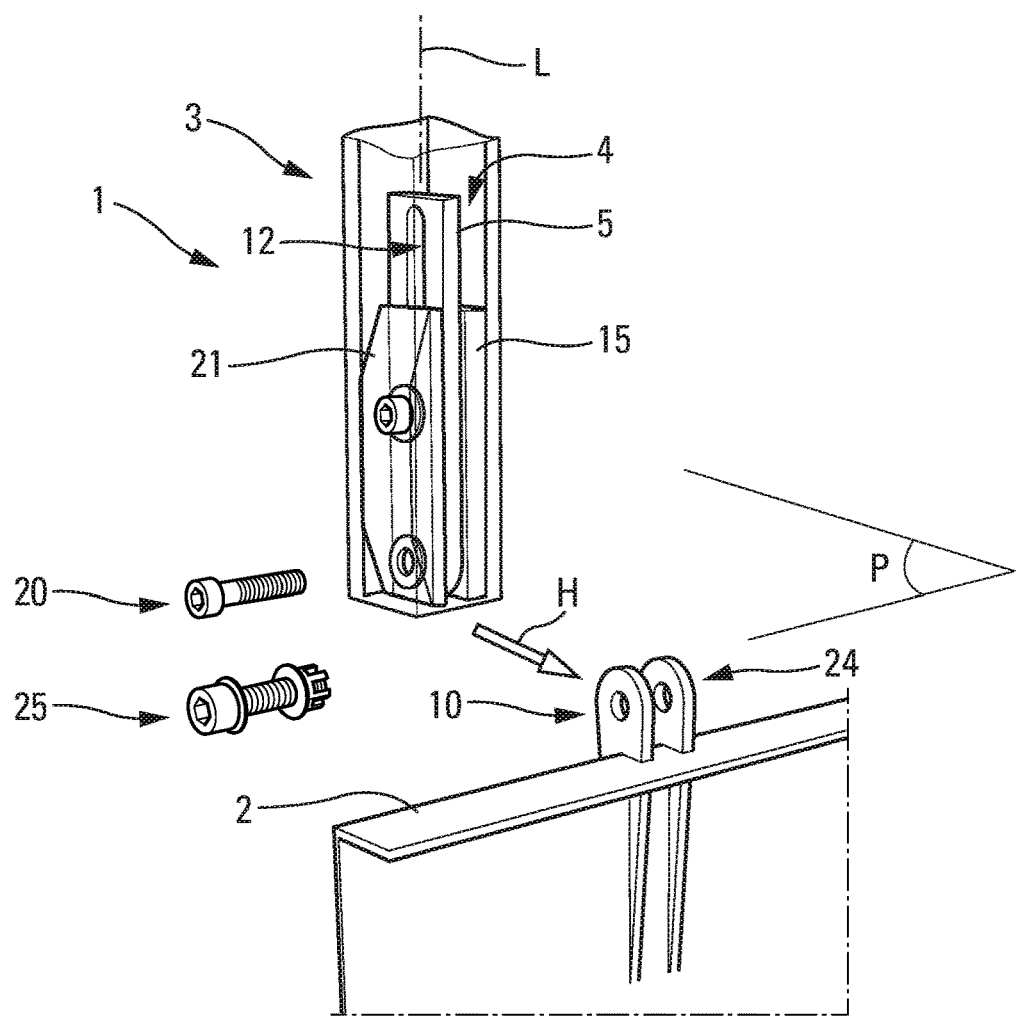
FIG. 7 is a perspective view similar to the view in FIG. 1, before linking, showing the linking part approaching a complementary linking element of a support element.

The linking part 1 also has a wedge 15. This wedge 15 is in the form of a plate with two faces 16 and 17. The face 16, as best seen in FIG. 5, is smooth and the face 17, as best seen in FIG. 4, is notched or serrated. The notched face 17 also has a plurality of projecting notches, as explained hereinbelow.

The wedge 15 is fastened via the smooth face 16 thereof to the wall 3D of the elongated section 3, inside the seat 4 of the linking part 1. As best seen in FIGS. 1, 2 and 4, the wedge 15 is fastened by screws 18 and 19 to the wall 3D, and additionally, for example, the fastening may include gluing.

The notched face 14 of the tenon 5 and the notched face 17 of the wedge 15 are configured to be complementary so as to be able to cooperate together and to be held together in the longitudinal direction L, when the notched faces 14 and 17 are brought into and held in contact against one another, as shown for example in FIG. 2. The notches of the notched faces 14 and 17 can be of different possible shapes, notably triangular. In a preferred embodiment, the notches are identical on the two notched faces 14 and 17 and in section are isosceles triangles, for example with a slightly rounded tip.

The linking part 1 also has bolt 9 having a threaded screw 9A and a nut 9B, and 20 having a threaded screw 20A and a nut 20B that are able to hold the notched faces 14 and 17 in contact against one another in a clamped position (FIG. 2), in the deployed position P2.

This link using complementary notched faces provides a solid fastening and compensates for the fact that the tenon 5 is fastened by the screws 9A and 20A that do not pass through round holes of the appropriate diameter, but through the oblong hole 12.

The tenon 5 may therefore be a retractable ball-joint tenon. The tenon 5 has significant longitudinal mobility attributable to the oblong hole or slot 12 and is able, after positioning as close as required (on account of the notches, which may have a very fine pitch) to absorb significant stresses in the traction/compression direction of the elongated section 3 following pressurization with the wedge 15 by tightening the screws.

Furthermore, the linking part 1 also has a pressure distribution wedge 21. This pressure distribution wedge 21 is designed to be fastened to the tenon 5 using the bolts 9 and 20. The pressure distribution wedge 21 has, for example, a U-shaped cross section with a contact plate 21A and two lateral branches or flanges 21B and 21C, as shown in FIG. 3. The contact plate 21A has two openings 22 and 23 dimensioned and configured for receiving the screws 9A and 20A therethrough. The pressure distribution wedge 21 enables the pressure generated by the screws 9A and 20A to be distributed via the contact plate 21A thereof over the plate 11 of the tenon 5.

Referring to FIGS. 1 to 7, the support element 2 has a clevis 24 as complementary linking element 10. The clevis 24 is a substantially U-shaped part making it possible to receive a shaft to form a pivoting link (i.e. a link with a degree of freedom). The ball joint 8 of the tenon 5 of the linking part 1 is linked to this clevis 24 using a bolt 25 formed by a screw 25A and a nut 25B (FIGS. 1 and 3).

Figure 6:
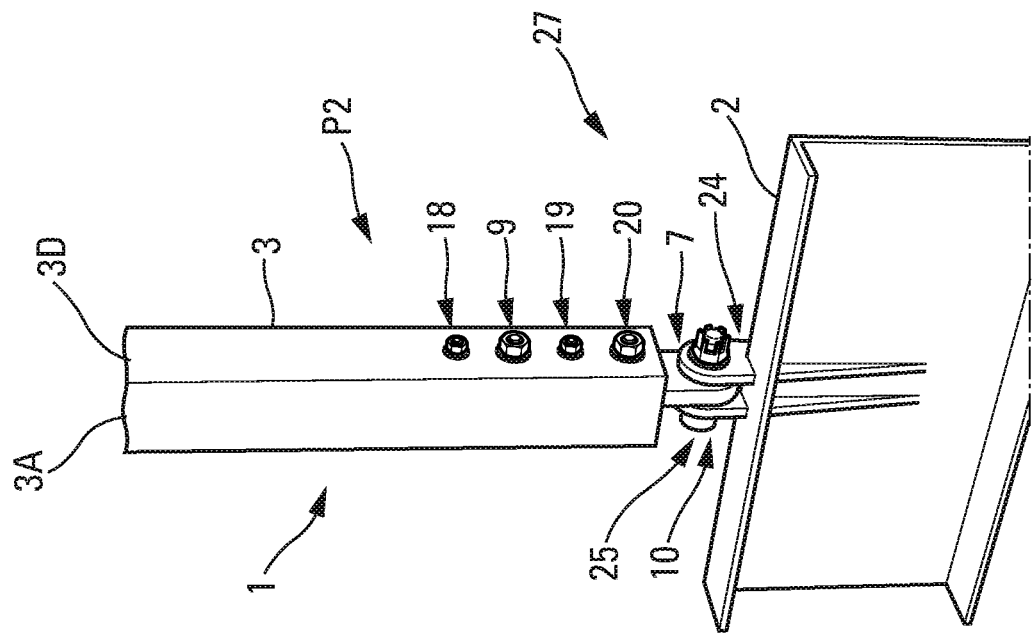
FIG. 6 is a perspective view similar to the view in Figure Sand taken from a second side.

Consequently, in the deployed position P1 shown in FIGS. 2, 5 and 6, the linking part 1 is linked by the linking element 7 (i.e. the ball joint 8) of the tenon 5 to the complementary linking element 10 (i.e. the clevis 24) of the support element 2.

Furthermore, the tenon 5 is fastened in this deployed position P2 inside the seat 4, and is pressed by the pressure distribution wedge 21 against the cooperating wedge 15. The tenon 5, the wedge 15 and the pressure distribution wedge 21 are fastened together inside the seat 4 using the bolts 9 and 20 on the walls 3C and 3D of the elongate section 3, as shown in FIG. 2.

Moreover, the linking part 1 may be made of a range of different materials, such as, but not limited to, titanium, steel or aluminium. The linking part 1, as described above, has numerous advantages. In particular, the linking part provides:

- a link that can be used in all directions, notably vertically downwards or upwards or in another direction,
- a simple link that is relatively easy to make, since the retracted tenon 5 does not hinder installation of the linking part 1,
- a quick link, since the linking part 1 can be installed quickly, since the linking part notably does not require any adjustment operations or drilling, and
- a clean link, since no drilling is required and installation of the linking part 1 does not generate any waste.

Referring to FIGS. 5 and 6, a mechanical assembly 27 illustrating the link as formed is shown. This mechanical assembly 27 includes an assembly comprising a linking part 1, such as the one described above, and a support element 2 to which the linking part 1 is linked. The support element 2 is provided with the clevis 24 to which the ball joint 8 of the tenon 5 of the linking part 1 is linked.

Figure 8:
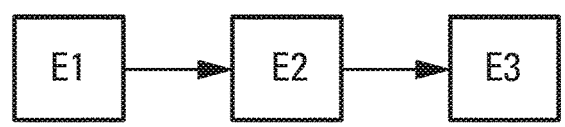
FIG. 8 is a flow diagram illustrating the main steps of a method for linking a linking part.

The linking part 1, as described above, is assembled with the support element 2 to form the mechanical assembly 27 shown in FIGS. 5 and 6, using a linking (or assembly) method shown in FIG. 8.

This linking (or assembly) method notably includes the following steps:
1) Step E1 that involves effecting a relative movement between, on one hand, the linking part 1 in which the tenon 5 is in the retracted position P1 and, on the other hand, the support element 2 in order to bring the linking part 1, within a plane (FIG. 7) that is orthogonal to the longitudinal axis L defined by the tenon 5 of the linking part 1, into a position in which a link can be made in this plane P. In the example in FIG. 7, the linking part 1 is moved, as shown by the arrow H, within the plane P, to a position as shown for example in FIG. 1, enabling the linking part 1 to be linked to the support element 2, which is assumed to be static.
2) Step E2 that involves bringing the tenon 5 (from the retracted position P1 in FIG. 1) into the deployed position P2 such that the linking element 7 of the tenon 5 is in an end position (in space) where it can be linked to the complementary linking element 10 of the support element 2.
3) Step E3 that involves linking the linking element 7 to the complementary linking element 10 using the bolt 25 such as to link the linking part 1 to the support element 2, as shown in FIGS. 2, 5 and 6.

Thus, holding the tenon 5 (which is intended to make the link) in the retracted position P1 prevents the tenon 5 from constituting an obstacle and enables the linking part 1 to be moved more easily towards the support element 2, notably in any direction in the plane P orthogonal to the longitudinal direction L, during implementation of step E1. Furthermore, once the position in the plane P has been reached, the link can be made easily, in step E2, by moving the tenon 5 from the retracted position P1 to the deployed position P2 in the longitudinal direction axis L to bring the tenon into a position in which the tenon can be directly linked to the support element 2.

The relative movement (or approach) carried out in step E1 in the plane P orthogonal to the longitudinal axis L can involve:
moving the linking part 1, the support element 2 (for example a frame or a cross member) being static,
moving the support element 2, the linking part 1 being static, or
moving the linking part 1 and the support element 2 simultaneously.

Furthermore, to implement step E3, the following successive operations can notably be performed:
installation of the screw 20A and the related nut 20B (not tightened),
installation of the screw 25A with the related nut 25B (not tightened) in the clevis 24 and the ball joint 8 placed in the clevis 24,
slight pre-tightening of the nuts 9B and 20B of the bolts 9 and 20 to move the complementary notches of the notched faces 14 and 17 into position,
full tightening of the nuts 9B and 20B of the bolts 9 and 20, and
full tightening of the nut 25B of the bolt 25.

Figure 9:
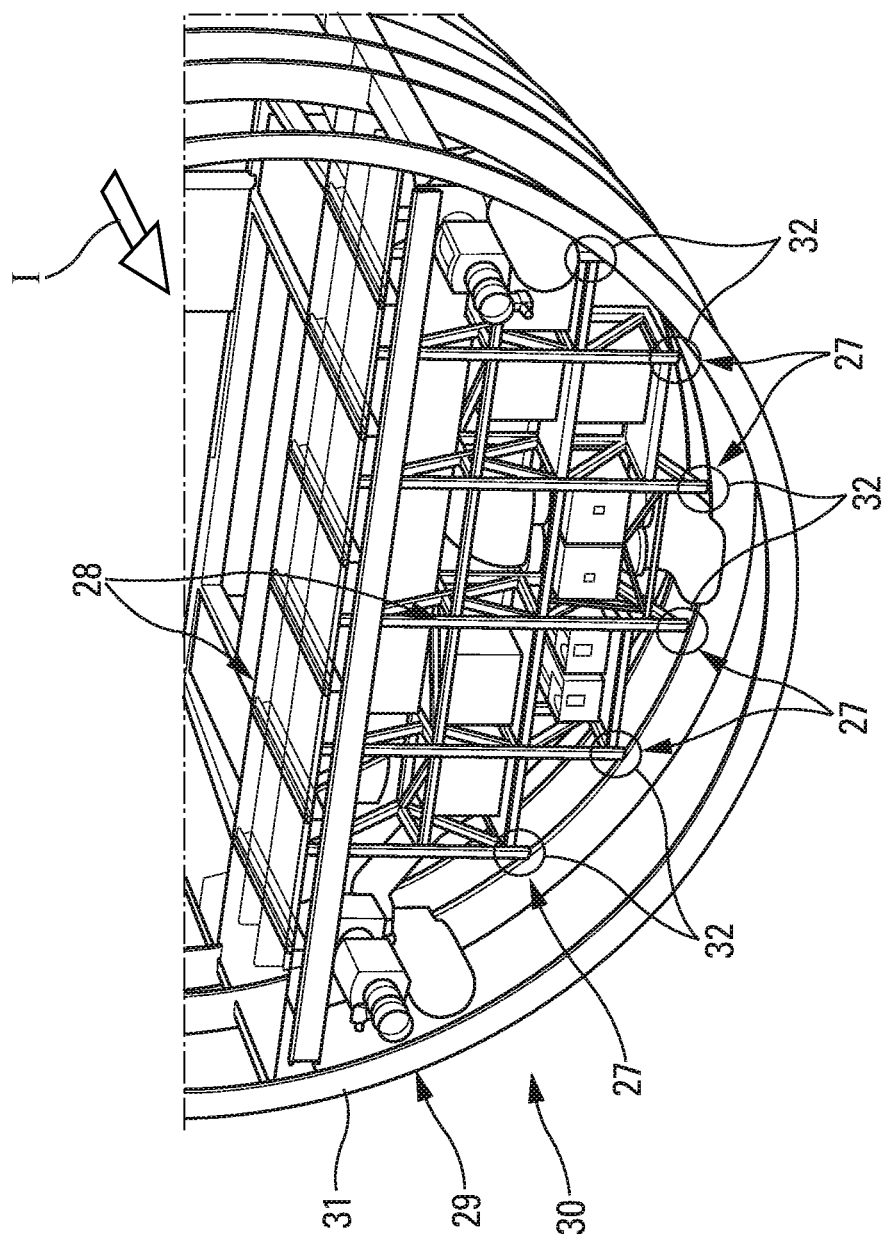
FIG. 9 is a partial perspective view of a portion of a fuselage of an aircraft in which a module is attached using fastening points.

One application of the linking part 1 is the fastening of a module onto an aircraft, in particular onto a transport plane, and notably the fastening of a nose cone module 28 onto the fuselage 29 of the aircraft 30, as shown in FIG. 9. For this purpose, the nose cone module 28 can be fitted with a floor, systems (routes, equipment), a cockpit and commercial elements (galley, toilets, and bulkhead).

In this case, the nose cone module 28 is fastened to an empty structural envelope 31 of the fuselage 29 of the aircraft 30 at a plurality of fastening (or linking) points 32, some (or possibly all) of which use linking parts 1 such as the one described above to form mechanical assemblies 27.

To do so, the equipped nose cone module 28 is moved, for example guided by detectors, in the fuselage 29 in the direction shown by an arrow I, and is brought to the related final position inside the fuselage 29. The module is then fastened to the fuselage 29 at the plurality of fastening points 32.

In this application, at each fastening point 32 comprising a mechanical assembly 27, the support element 2 is part of the fuselage 29 or corresponds to a part fastened to the fuselage 29 and the linking part 1 is part of the nose cone module 28 or corresponds to a part (such as, for example, a peg) fastened to the nose cone module 28, or vice versa.

In this specific application, during movement of the module 28, the linking parts 1 in the retracted position free up enough space from the frames on both sides to enable horizontal movement of the module 28 during integration thereof into the structural envelope 31 of the fuselage 29, this movement being performed at the final height. This movement, which may be performed automatically, includes an initial rapid phase, since the structural obstacle is distant (as a result of the ogive-shaped characteristic of a nose cone), then a slow phase when the module arrives in position (proximity to the structure). This enables objects to be brought very close to the structure with limited risk. Once in the theoretical position, the module 28 is partially docked with the structural envelope 31 of the fuselage 29, notably using the aforementioned links to the fastening points 32.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:
1. A linking part to be linked to a support element of an aircraft, comprising:
at least one elongated section, the elongated section having an internal longitudinal seat,
a tenon made in the form of a plate and having a free longitudinal end and a first notched face,
a wedge having a second notched face, the wedge being rigidly connected to the elongated section of the linking part inside the seat, and wherein the first and second notched faces are configured to be complementary so as to be able to be held together once brought into contact with one another, and a linking element operably disposed at the free longitudinal end, the tenon is configured to be mounted in the internal longitudinal seat and configured to adopt one or other of the following two longitudinal positions:

a retracted position (P1) in which the tenon is fully inserted in the seat, and a deployed position in which the tenon is partially withdrawn from the internal longitudinal seat, the free longitudinal end including the linking element being outside the internal longitudinal seat and configured to be linked by the linking element to the support element.

2. The linking part according to claim 1, wherein the tenon further comprises a longitudinal oblong hole or slot configured to receive at least one fastening screw.

3. The linking part according to claim 1, wherein the tenon is configured to be held by friction in the retracted position (P1).

4. The linking part according to claim 1, further comprising at least one screw configured to hold the tenon in the retracted position (P1).

5. The linking part according to claim 1, wherein the linking element includes a ball joint mounted in an opening formed in the free longitudinal end of the tenon.

6. An aircraft assembly comprising the linking part according to claim 1, and a support element to which the linking part is linked.

7. The aircraft assembly of claim 6, wherein the support element further includes a clevis to which the ball joint of the tenon of the linking part is linked.

8. An aircraft module, comprising at least one linking part according to claim 1.

9. The aircraft module according to claim 8, wherein the module is a nose cone module.

10. An aircraft, comprising at least one module according to claim 8.

11. The aircraft according to claim 10, further comprising a fuselage with at least one structural envelope into at least one module is fastened, the at least one module is fastened in the structural envelope by at least a plurality of mechanical assemblies.

12. A method for linking a linking part to a support element, comprising:

providing the linking part according to claim 1, effecting a relative movement between, on one hand, the linking part in which the tenon is in the retracted position (P1) and, on the other hand, the support element in order to bring the linking part, within a plane (P) orthogonal to a longitudinal direction (L) defined by the tenon of the linking part, into a position in which a link can be made in this orthogonal plane (P), bringing the tenon into the deployed position (P2) such that the linking element of the tenon is in an end position where it can be linked to a complementary linking element of the support element, and linking the linking element to the complementary linking element such as to link the linking part to the support element.

13. A linking part to be linked to a support element of an aircraft, comprising:

at least one elongated section, the elongated section having an internal longitudinal seat, a tenon made in the form of a plate and having a free longitudinal end and a first notched face, a wedge having a second notched face, the wedge being rigidly connected to the elongated section of the linking part inside the seat, and wherein the first and second notched faces are configured to be complementary so as to be able to be held together once brought into contact with one another, at least one screw configured to hold the first and second notched faces in contact with one another in a clamped position, and a linking element operably disposed at the free longitudinal end, the tenon is configured to be mounted in the internal longitudinal seat and configured to adopt one or other of the following two longitudinal positions:

a retracted position (P1) in which the tenon is fully inserted in the seat, and a deployed position in which the tenon is partially withdrawn from the internal longitudinal seat, the free longitudinal end including the linking element being outside the internal longitudinal seat and configured to be linked by the linking element to the support element.

14. The linking part according to claim 13, wherein the tenon further comprises a longitudinal oblong hole or slot configured to receive at least one fastening screw.

15. The linking part according to claim 13, wherein the tenon is configured to be held by friction in the retracted position (P1).

16. The linking part according to claim 13, further comprising at least one screw configured to hold the tenon in the retracted position (P1).

17. A linking part to be linked to a support element of an aircraft, comprising:

at least one elongated section, the elongated section having an internal longitudinal seat, a tenon made in the form of a plate and having a free longitudinal end, a pressure distribution wedge configured to be fastened to the tenon by a plurality of screws, and a linking element operably disposed at the free longitudinal end, the tenon is configured to be mounted in the internal longitudinal seat and configured to adopt one or other of the following two longitudinal positions:

a retracted position (P1) in which the tenon is fully inserted in the seat, and a deployed position in which the tenon is partially withdrawn from the internal longitudinal seat, the free longitudinal end including the linking element being outside the internal longitudinal seat and configured to be linked by the linking element to the support element.

18. The linking part according to claim 17, wherein the tenon further comprises a longitudinal oblong hole or slot configured to receive at least one fastening screw.

19. The linking part according to claim 17, wherein the tenon is configured to be held by friction in the retracted position (P1).

* * * * *